US011990973B2

(12) United States Patent
Landström et al.

(10) Patent No.: US 11,990,973 B2
(45) Date of Patent: May 21, 2024

(54) BEAM MANAGEMENT FOR A RADIO TRANSCEIVER DEVICE

(71) Applicant: TELEFONAKTIEBOLAGET LM ERICSSON (PUBL), Stockholm (SE)

(72) Inventors: Anders Landström, Boden (SE); Arne Simonsson, Gammelstad (SE); Peter Ökvist, Luleå (SE); Magnus Thurfjell, Luleå (SE); Kjell Larsson, Luleå (SE); Medhat Mohamad, Luleå (SE); Olle Rosin, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/919,458

(22) PCT Filed: Apr. 20, 2020

(86) PCT No.: PCT/IB2020/053710
§ 371 (c)(1),
(2) Date: Oct. 17, 2022

(87) PCT Pub. No.: WO2021/214512
PCT Pub. Date: Oct. 28, 2021

(65) Prior Publication Data
US 2023/0155661 A1 May 18, 2023

(51) Int. Cl.
H04B 7/06 (2006.01)
H04B 7/0408 (2017.01)

(52) U.S. Cl.
CPC ......... *H04B 7/0695* (2013.01); *H04B 7/0408* (2013.01)

(58) Field of Classification Search
CPC ............... H04B 7/0408; H04B 7/0695; H04B 7/06952; H04B 7/06958; H04B 7/086;
(Continued)

(56) References Cited

U.S. PATENT DOCUMENTS 6,351,243 B1 * 2/2002 Derneryd ................. H01Q 3/26
343/754
9,787,378 B2 * 10/2017 Tajima ................. H04B 7/0456
(Continued)

FOREIGN PATENT DOCUMENTS

WO 2019050440 A1 3/2019

OTHER PUBLICATIONS

3rd Generation Partnership Project; Technical Specification Group Radio Access Network; NR; Radio Resource Control (RRC) protocol specification (Release 15), 3GPP TS 38.331 V15.7.0 (Sep. 2019).
(Continued)

*Primary Examiner* — James M Perez

(57) ABSTRACT

There is provided mechanisms for beam management. A method is performed by a radio transceiver device. The method comprises obtaining an angle spread value for signal paths towards a second radio transceiver device. The method comprises performing a beam management procedure for selecting which directional beam to use for communication with the second radio transceiver device by transmitting or receiving reference signals in a candidate set of directional beams. Which directional beams to include in the candidate set of directional beams is dependent on the angle spread value by the angle spread value determining sparsity of the directional beams in the candidate set of directional beams.

20 Claims, 9 Drawing Sheets

(58) Field of Classification Search
CPC .. H04B 7/0891; H04B 7/0897; H04B 7/0619; H04B 7/0636; H04B 7/0639; H04B 7/0626
See application file for complete search history.

(56) References Cited

U.S. PATENT DOCUMENTS

| | | | | |
|---|---|---|---|---|
| 10,205,495 | B2* | 2/2019 | Faxér | H04B 7/0626 |
| 10,333,596 | B2* | 6/2019 | Faxér | H04B 7/0634 |
| 10,454,544 | B2* | 10/2019 | Faxér | H04B 7/0626 |
| 10,505,600 | B2* | 12/2019 | Faxér | H04B 7/0617 |
| 10,536,862 | B2* | 1/2020 | Ramachandra | H04W 36/0094 |
| 10,615,856 | B2* | 4/2020 | Faxér | H04B 7/0634 |
| 10,630,355 | B2* | 4/2020 | Faxér | H04B 7/0617 |
| 10,673,512 | B2* | 6/2020 | Athley | H04B 7/0617 |
| 10,764,800 | B2* | 9/2020 | Ugurlu | H04W 72/046 |
| 10,784,972 | B2* | 9/2020 | Axmon | H04B 7/0874 |
| 10,812,155 | B2* | 10/2020 | da Silva | H04L 5/005 |
| 10,903,880 | B2* | 1/2021 | Faxér | H04B 7/0456 |
| 10,911,963 | B1* | 2/2021 | Petersson | H01Q 3/34 |
| 10,939,389 | B2* | 3/2021 | Muruganathan | H04B 7/0482 |
| 11,012,138 | B2* | 5/2021 | Simonsson | H04B 7/0695 |
| 11,025,322 | B2* | 6/2021 | Gao | H04B 7/0639 |
| 11,122,472 | B2* | 9/2021 | Da Silva | H04W 36/06 |
| 11,122,571 | B2* | 9/2021 | Vieira | H04B 7/088 |
| 11,211,982 | B1* | 12/2021 | Horn | H04B 7/0691 |
| 11,224,039 | B2* | 1/2022 | Asplund | H04W 36/0044 |
| 11,228,357 | B2* | 1/2022 | Leroux | H04B 7/0452 |
| 11,251,843 | B2* | 2/2022 | Faxér | H04B 7/0478 |
| 11,271,616 | B2* | 3/2022 | Faxér | H04B 7/0478 |
| 11,388,685 | B2* | 7/2022 | Muruganathan | H04W 52/367 |
| 11,476,902 | B2* | 10/2022 | Faxér | H04B 7/0456 |
| 11,546,041 | B2* | 1/2023 | El-Keyi | H04B 7/0695 |
| 11,671,154 | B2* | 6/2023 | Faxér | H04B 7/0634 375/267 |
| 11,770,286 | B2* | 9/2023 | Timo | H04L 25/0254 375/262 |
| 11,838,904 | B2* | 12/2023 | Vieira | H04B 7/0408 |
| 11,863,251 | B2* | 1/2024 | Faxér | H04B 7/0486 |
| 11,876,581 | B2* | 1/2024 | Faxér | H04B 7/0626 |
| 2017/0288751 | A1* | 10/2017 | Faxér | H04B 7/0452 |
| 2017/0331544 | A1* | 11/2017 | Athley | H04B 7/0417 |
| 2017/0331670 | A1* | 11/2017 | Parkvall | H04W 52/0251 |
| 2018/0076859 | A1* | 3/2018 | Faxer | H04B 7/0465 |
| 2018/0191411 | A1* | 7/2018 | Faxér | H04B 7/0417 |
| 2018/0227728 | A1* | 8/2018 | Kim | H04B 7/063 |
| 2018/0287687 | A1* | 10/2018 | Wu | G01S 3/043 |
| 2018/0302803 | A1* | 10/2018 | Ramachandra | H04W 56/001 |
| 2019/0056472 | A1* | 2/2019 | Smith | G01S 3/46 |
| 2019/0116605 | A1* | 4/2019 | Luo | H04W 72/0446 |
| 2019/0246394 | A1* | 8/2019 | Asplund | H04W 36/30 |
| 2019/0341989 | A1* | 11/2019 | Raghavan | G01S 11/10 |
| 2020/0007203 | A1* | 1/2020 | Zhou | H04B 7/0482 |
| 2020/0028544 | A1* | 1/2020 | Bengtsson | H04B 7/088 |
| 2020/0028745 | A1* | 1/2020 | Parkvall | H04L 41/0816 |
| 2020/0163038 | A1* | 5/2020 | Li | H04L 27/2666 |
| 2020/0220604 | A1* | 7/2020 | Simonsson | H04B 7/0626 |
| 2020/0358515 | A1* | 11/2020 | Li | H04W 16/28 |
| 2021/0013945 | A1* | 1/2021 | Leroux | H04B 7/0486 |
| 2021/0058131 | A1* | 2/2021 | Zhu | H04B 7/063 |
| 2022/0045738 | A1* | 2/2022 | He | H04B 7/0617 |
| 2022/0123816 | A1* | 4/2022 | El-Keyi | H04B 7/0695 |
| 2022/0294513 | A1* | 9/2022 | Landstrom | H04B 7/0617 |
| 2022/0368583 | A1* | 11/2022 | Timo | G06N 3/088 |
| 2022/0385342 | A1* | 12/2022 | Shen | H04B 7/0617 |
| 2022/0394697 | A1* | 12/2022 | Kim | H04W 72/54 |
| 2023/0051630 | A1* | 2/2023 | Gurelli | H04B 7/0695 |
| 2023/0089054 | A1* | 3/2023 | Gurelli | G01S 3/46 342/378 |
| 2023/0109947 | A1* | 4/2023 | Parkvall | H04J 11/0079 455/418 |
| 2023/0155661 | A1* | 5/2023 | Landström | H04B 7/0695 375/262 |

OTHER PUBLICATIONS

3GPP, "3rd Generation Partnership Project; Technical Specification Group Radio Access Network; Spatial channel model for Multiple Input Multiple Output (MIMO) simulations (Release 15)", TR 25.996 V15.0.0, Jun. 2018.

\* cited by examiner (a)

(b)

BEAM MANAGEMENT FOR A RADIO TRANSCEIVER DEVICE

PRIORITY CLAIM

This application is a national stage of International Application No. PCT/IB2020/053710, filed Apr. 20, 2020, the entire disclosure of which is fully incorporated by reference herein for all purposes.

TECHNICAL FIELD

Embodiments presented herein relate to a method, a radio transceiver device, a computer program, and a computer program product for beam management.

BACKGROUND

In communications networks, there may be a challenge to obtain good performance and capacity for a given communications protocol, its parameters and the physical environment in which the communications network is deployed.

For example, one parameter in providing good performance and capacity for a given communications protocol in a communications network is beamforming.

For beamforming of data and control signaling, multiple antenna elements are used to amplify the signal in a spatial direction by constructive interference, resulting in a directional gain and thereby a certain beam shape. A predefined setup of such beams is referred to as a Grid of Beams (GoB).

The long-term channel properties of deployed radio transceiver devices in, or served by, the network, change for example with mobility, so as a radio transceiver device provided in a user equipment (UE) moves, a radio transceiver device provided in a transmission and reception point (TRP) of the network needs to switch which beam from the GoB to use for data transmissions to the UE. Beam management considers the process of determining a suitable beam to transmit or receive data on. Multiple reference signal measurements and reportings thereof have been standardized to enable beam management. Examples of reference signals suitable for beam management are Channel State Information Reference Signals (CSI-RS) and CSI-RS specifically for Beam Management (CSI-RS-BM). In addition, the UEs can report on a Synchronization Signal Block (SSB) which is periodically transmitted in time on multiple beams. The SSB defines the downlink coverage of the network but since each SSB is associated with a static overhead loss, they may be beamformed with fewer beams than what is used for data. Typical configurations involve forming one or a few wide beams per sector for SSB, whilst beams used for data transmission utilize the full beamforming gain. The spatial footprint, or spatial radiation pattern, of one wide beam might therefore cover the spatial footprints, or spatial radiation patterns, of several narrow beams utilized for data transmission.

A radio access network node searches the beam space by, from its TRP, transmitting CSI-RS-BM in candidate beams. The UE is instructed to perform measurements on the beamformed CSI-RS-BM and report up to 4 best quality values (with corresponding CSI-RS-BM resource ID) back to the radio access network node. One such iteration, i.e. the process of transmitting a set of candidate beams and retrieving a corresponding measurement report, is referred to as a beam sweep. Once the beam sweep is complete the radio access network node can decide on which beam to use as a serving data beam for the UE, and which beams to try as beam candidates in the next beam sweep.

Typically a beam sweep involves the radio access network node to test a number of beam candidates using a selected scheme that defines which candidate beams to be part of the beam sweep. There could be different types of such schemes, such as random selection of candidate beams, closest neighbor search, transmission of a sparse set of beams, or hierarchical schemes where candidate beams are selected as those covered by the spatial footprint of the best wide beam (given by e.g. SSB reports).

Each candidate beam that is to be tested adds an overhead load to the beam management and hence also to the overall system performance. The question of how, and how often, beam management should be performed therefore becomes a trade-off between overhead and performance degradation, where the performance degradation is due to suboptimal beam selection caused by mobility of the UE and/or changes in the radio propagation environment.

Hence, there is still a need for improved beam management.

SUMMARY

An object of embodiments herein is to provide efficient beam management that does not suffer from the issues noted above, or at least where the above noted issues are mitigated or reduced.

According to a first aspect there is presented a method for beam management. The method is performed by a radio transceiver device. The method comprises obtaining an angle spread value for signal paths towards a second radio transceiver device. The method comprises performing a beam management procedure for selecting which directional beam to use for communication with the second radio transceiver device by transmitting or receiving reference signals in a candidate set of directional beams. Which directional beams to include in the candidate set of directional beams is dependent on the angle spread value by the angle spread value determining sparsity of the directional beams in the candidate set of directional beams.

According to a second aspect there is presented a radio transceiver device for beam management. The radio transceiver device comprises processing circuitry. The processing circuitry is configured to cause the radio transceiver device to obtain an angle spread value for signal paths towards a second radio transceiver device. The processing circuitry is configured to cause the radio transceiver device to perform a beam management procedure for selecting which directional beam to use for communication with the second radio transceiver device by transmitting or receiving reference signals in a candidate set of directional beams. Which directional beams to include in the candidate set of directional beams is dependent on the angle spread value by the angle spread value determining sparsity of the directional beams in the candidate set of directional beams.

According to a third aspect there is presented radio transceiver device for beam management. The radio transceiver device comprises an obtain module configured to obtain an angle spread value for signal paths towards a second radio transceiver device. The radio transceiver device comprises a beam management module configured to perform a beam management procedure for selecting which directional beam to use for communication with the second radio transceiver device by transmitting or receiving reference signals in a candidate set of directional beams. Which directional beams to include in the candidate set of directional beams is dependent on the angle spread value by the angle spread value determining sparsity of the directional beams in the candidate set of directional beams.

According to a fourth aspect there is presented a computer program for beam management, the computer program comprising computer program code which, when run on a radio transceiver device, causes the radio transceiver device to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously these aspects provide efficient beam management.

Advantageously the proposed beam management does not suffer from the issues noted above.

Advantageously the proposed beam management provides an additional decision layer that allows for better selection of which scheme that defined which directional beams to include in the candidate set of directional beams at a specific time.

Advantageously the proposed beam management enables efficient use of beam management resources, yielding less signaling overhead.

Advantageously the proposed beam management enables energy savings whilst causing less interference in neighboring cells from beam sweeps.

Advantageously the proposed beam management enables a reduction in interference, which further allows for higher capacity and system performance.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
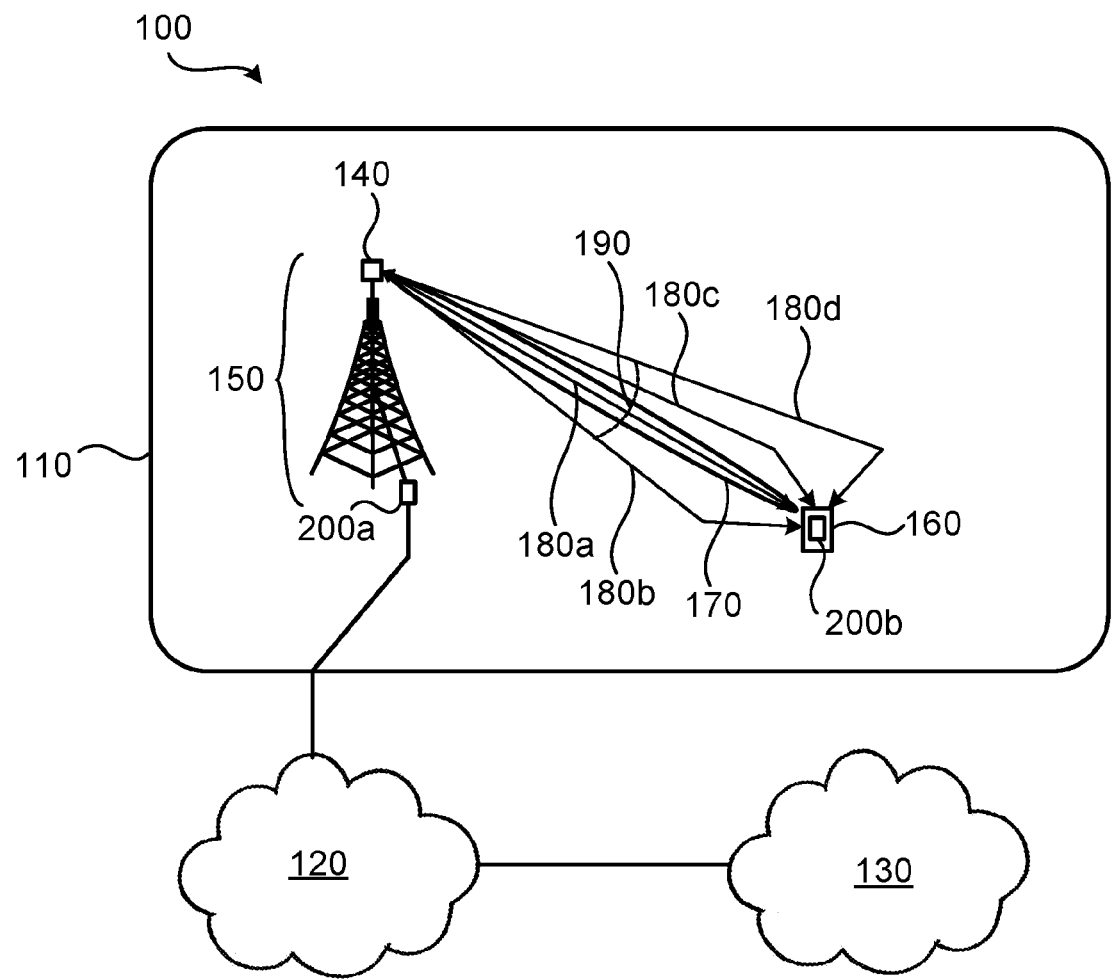
FIG. 1 is a schematic diagram illustrating a communication network according to embodiments.

FIG. 1 is a schematic diagram illustrating a communication network 100 where embodiments presented herein can be applied. The communication network 100 could be a third generation (3G) telecommunications network, a fourth generation (4G) telecommunications network, a fifth generation (5G) telecommunications network, or any advancement thereof, and support any 3GPP telecommunications standard, where applicable.

The communication network 100 comprises a radio access network node 150 configured to provide network access to a user equipment (UE) 160 in a radio access network 110. The radio access network 110 is operatively connected to a core network 120. The core network 120 is in turn operatively connected to a service network 130, such as the Internet. The UE 160 is thereby enabled to access services of the service network 130 and to exchange data with the service network 130. The operations of accessing services and exchanging data are performed via the radio access network node 150. The radio access network node 150 comprises, is collocated with, is integrated with, or is in operational communications with, a Transmit and Receive Point (TRP) 140.

Each of the radio access network node 150 and the UE 160 comprises a radio transceiver device 200a, 200b. In the illustrative example of FIG. 1, the radio transceiver device 200a is part of a radio access network node 150, and the second radio transceiver device 200b is part of a user equipment 160. However, in other aspects, the radio transceiver device 200a is part of a user equipment 160, and the second radio transceiver device 200b is part of a radio access network node 150. In still further aspects, the radio transceiver device 200a is part of a first user equipment 160, and the second radio transceiver device 200b is part of a second user equipment 160.

Examples of radio access network nodes 150 are radio base stations, base transceiver stations, Node Bs (NBs), evolved Node Bs (eNBs), gNBs, access points, access nodes, and backhaul nodes. Examples of UEs 160 are wireless devices, mobile stations, mobile phones, handsets, wireless local loop phones, smartphones, laptop computers, tablet computers, network equipped sensors, network equipped vehicles, and so-called Internet of Things devices.

The radio access network node 150 (via its TRP 140) and the UE 160 are configured to communicate with each other in directional beams, one of which is illustrated at reference numeral 170. The directional beam 170 corresponds to a first path 180a between the TRP 140 and the UE 160. However, there might be further paths, such as paths 180b, 180c, 180d between the TRP 140 and the UE 160 and along which communication in further directional beams can be made between the TRP 140 and the UE 160 at a sufficiently high quality (for example by the RSRP being higher than some quality threshold value). Hence, there might be more than one path between the TRP 140 and the UE 160 that can be used for reliable communication between the TRP 140 and the UE 160. The angular diversity between these paths 180a:180d might be represented by an angle spread value 190. The angle spread value 190 is thus a value of the angle spread of the paths between the TRP 140 and the UE 160 that can be used for reliable communication. Ways in which the angle spread could be defined and determined will be disclosed below.

As noted above there is a need for improved beam management.

In this respect, if large overhead signaling for beam management is acceptable, a comparatively large set of candidate directional beams could be tested during one beam sweep so that even a UE 160 for which the properties of the radio propagation channel are fast-moving always is covered by their best directional beam. On the other hand, if such a large overhead signalling is not acceptable, only a comparatively small set of candidate directional beams could be tested during one beam sweep. But the question is then which directional beams to include in the candidate set of directional beams so as to reduce the risk of selecting directional beams yielding poor performance or even beam failure.

Selecting a suitable set of candidate directional beams allows for reducing overhead signalling whilst minimizing the risk of poor selection of directional beams for communication of data and/or control signalling. But due to differences in the radio channel conditions, and/or due to movement of the communicating radio transceiver devices one single set of candidate directional beams, or one single way to select which directional beams to be included in the set of candidate directional beams, is not likely optimal for every situation. For instance, directional beams with low angular distance between neighboring beams might yield the best set of candidate directional beams to test for a user equipment 160 at a first location (e.g. in line of sight (LoS) conditions), whilst directional beams with high angular distance between neighboring beams might yield the best set of candidate directional beams to test as the user equipment moves to a second location (e.g. in non-line of sight (NLoS) conditions where other drastically different signal paths may be important to find).

Figure 2:
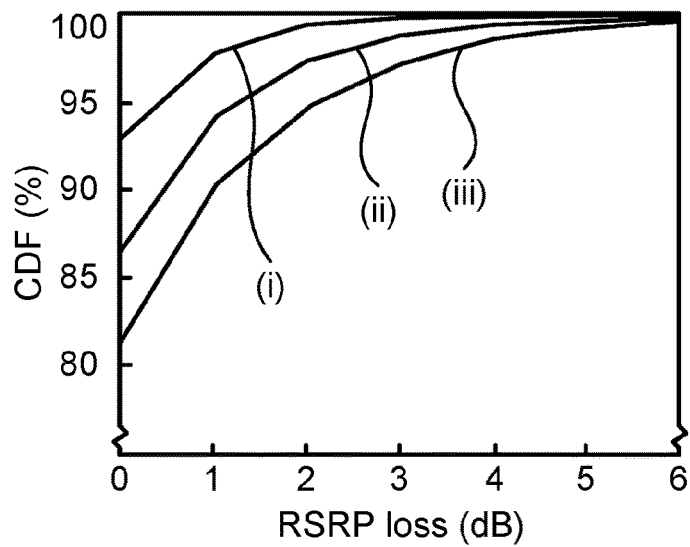
FIG. 2 shows cumulative distribution functions of measurements of resulting reference signal received power losses versus the best of all beams in a GoB.
Figure 2:
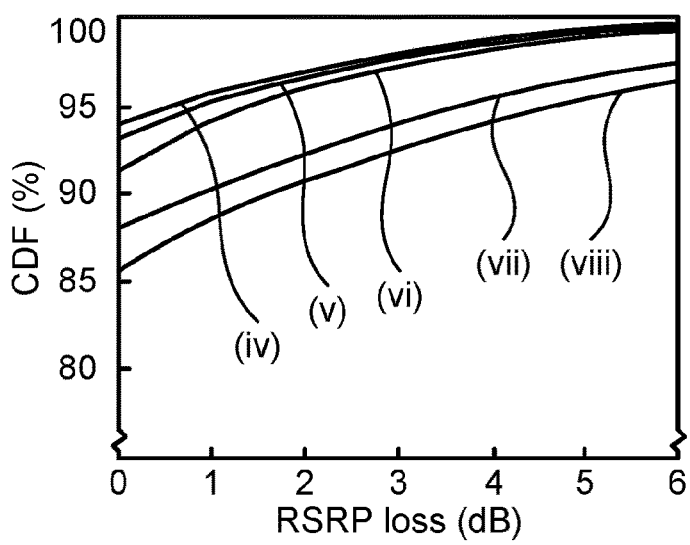

To further illustrate this, FIG. 2 at (i)-(viii) shows the cumulative distribution functions (CDFs) of measurements of the resulting reference signal received power (RSRP) losses versus the best of all beams in the GoB for eight different candidate set of directional beams. In FIG. 2(a) is shown results (i)-(iii) for three candidate sets of directional beams having comparatively high spread among the beams and in FIG. 2(b) is shown results (iv)-(viii) for five candidate sets of beams having comparatively low spread among the beams. The CDFs in FIG. 2(b) all starts at comparatively high values (all above 85%) but have heavy tails (i.e., all have moderate to low slopes) whereas the CDFs in FIG. 2(a) have lower initial values, but do not suffer from the heavy tails as for the results of the candidate sets of beams in FIG. 2(a). In this respect, a candidate set of beams having beams with comparatively low spread among the beams (such as in a neighbor sweep scheme) works well most of the time when beam jumps are sufficiently small, but such a candidate set of beams cannot be used to identify large beam jumps, which are sometimes required. In this respect, a beam jump generally refers to the angle difference in the GoB between a previous best beam and a new best beam. This causes the heavy tails shown in FIG. 2(b). A candidate set of beams having beams with comparatively high spread among the beams works well for large beam jumps, but requires more time to find the optimal beam when only small beam jumps are needed.

The embodiments disclosed herein relate to mechanisms for beam management. In order to obtain such mechanisms there is provided a radio transceiver device 200a, a method performed by the radio transceiver device 200a, a computer program product comprising code, for example in the form of a computer program, that when run on a radio transceiver device 200a, causes the radio transceiver device 200a to perform the method.

Figure 3:
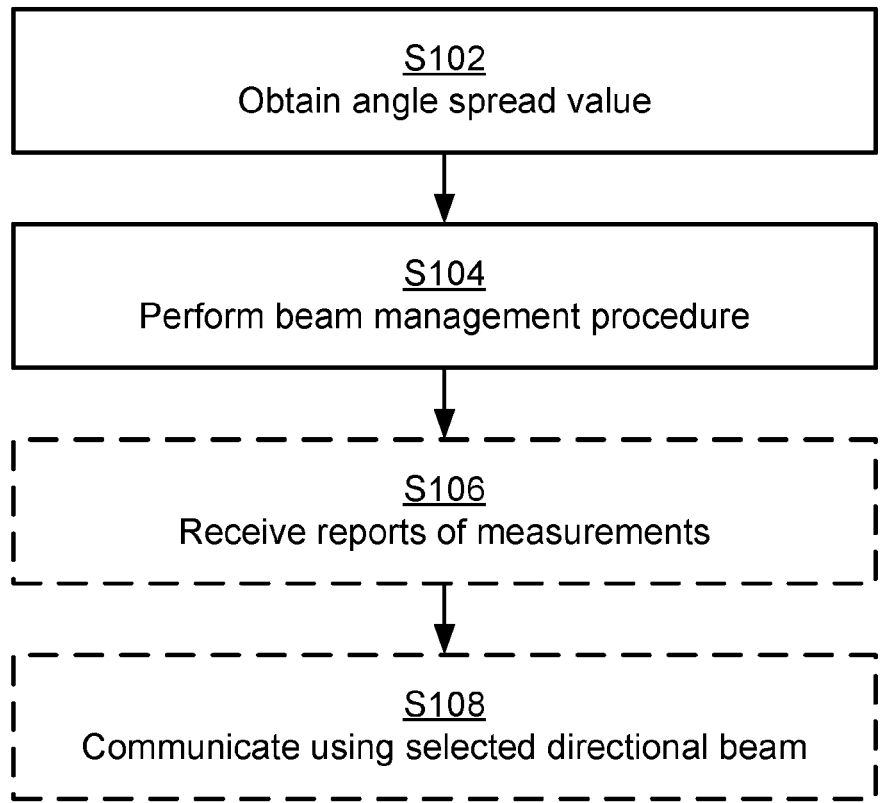
FIG. 3 is a flowchart of methods according to embodiments.

FIG. 3 is a flowchart illustrating embodiments of methods for beam management. The methods are performed by the radio transceiver device 200a. The methods are advantageously provided as computer programs 920. As disclosed above, in a first example, radio transceiver device 200a is part of a radio access network node 150, and the second radio transceiver device 200b is part of a user equipment 160. However, in another example, the radio transceiver device 200a is part of a user equipment 160, and the second radio transceiver device 200b is part of a radio access network node 150. In still another example, the radio transceiver device 200a is part of a first user equipment 160, and the second radio transceiver device 200b is part of a second user equipment 160.

It is assumed that radio transceiver device 200a is to perform a beam management procedure with radio transceiver device 200b. The beam management procedure involves the radio transceiver device 200a to transmit (to radio transceiver device 200b) or receive (from radio transceiver device 200b) reference signals in a candidate set of directional beams. According to the herein disclosed embodiments, a selection is made of which directional beams to include in the candidate set of directional beams at a particular time. This selection is based on an angle spread value 190. Hence, the radio transceiver device 200a is configured to perform steps S102, S104:

S102: The radio transceiver device 200a obtains an angle spread value 190 for signal paths towards a second radio transceiver device 200b.

S104: The radio transceiver device 200a performs a beam management procedure for selecting which directional beam to use for communication with the second radio transceiver device 200b. The beam management procedure involves the radio transceiver device 200a to transmit or receive reference signals in a candidate set of directional beams.

Which directional beams to include in the candidate set of directional beams is dependent on the angle spread value 190. In this respect, the angle spread value 190 determines the sparsity of the directional beams in the candidate set of directional beams. This method allows the directional beams in the candidate set of directional beams to be dynamically updated as the angle spread value 190 changes over time.

The radio transceiver device 200a is thereby enabled to switch between using different candidate set of directional beams based on evaluation of the angle spread.

Embodiments relating to further details of beam management as performed by the radio transceiver device 200a will now be disclosed.

There could be different ways to define the angle spread.

In some aspects, the angle spread is defined as in Annex A of 3GPP TS "Spatial channel model for Multiple Input Multiple Output (MIMO) simulations", version 15.0.0. In this document, the angle spread is denoted $\sigma_{AS}$. With N multi-paths, and where each multi-path has M sub-paths, the angle spread $\sigma_{AS}$ is given by:

$$\sigma_{AS} = \sqrt{\left(\sum_{n=1}^{N}\sum_{m=1}^{M}(\theta_{n,m,\mu})^2 \cdot P_{n,m}\right) \Big/ \left(\sum_{n=1}^{N}\sum_{m=1}^{M}P_{n,m}\right)} \quad (1)$$

In equation (1), $P_{n,m}$ is the power for the m:th sub-path of the n:th multi-path, $\theta_{n,m,\mu}$ is defined as:

$$\theta_{n,m,\mu} = \mathrm{mod}(\theta_{n,m} - \mu_\theta + \pi, 2\pi) - \pi$$

and $\mu_\theta$ is defined as:

$$\mu_\theta = \left(\sum_{n=1}^{N}\sum_{m=1}^{M}\theta_{n,m} \cdot P_{n,m}\right) \Big/ \left(\sum_{n=1}^{N}\sum_{m=1}^{M}P_{n,m}\right)$$

and $\theta_{n,m}$ is the angle of arrival (AoA) or the angle of departure (AoD) of the m:th sub-path of the n:th multi-path.

In other aspects, the angle spread value 190 is defined by a weighted or non-weighted L1/L2 norm, for example as given by:

$$\sigma_{AS} = \sum_{i=1}^{N-1}\left(\sqrt{|\theta_i - \theta_0|^2 + |\phi_i - \phi_0|^2}\right),$$

$$\sigma_{AS} = \left(\sum_{i=1}^{N-1}\left(\sqrt{|\theta_i - \theta_0|^2 + |\phi_i - \phi_0|^2} \cdot P_i\right)\right) \Big/ \left(\sum_{i=1}^{N-1}P_i\right), \text{ or}$$

$$\sigma_{AS} = \left(\sum_{i=1}^{N-1}((|\theta_i - \theta_0| + |\phi_i - \phi_0|) \cdot P_i)\right) \Big/ \left(\sum_{i=1}^{N-1}P_i\right)$$

where again $\sigma_{AS}$ denotes the angle spread value 190. Further, N is the total number of reported candidate beams, and $P_i$, $\theta_i$, and $\phi_i$ denotes power, elevation and azimuth, respectively, of the i:th reported candidate beam, denoting the best reported beam by index i=0.

There could be different ways for the radio transceiver device 200a to obtain the angle spread value 190 in step S102.

In some aspects, it is assumed that the angle spread value 190 is obtained in step S102 by the radio transceiver device 200a receiving measurement reportings from the second radio transceiver device 200b. Embodiments related thereto will now be disclosed.

That is, in some aspects, the radio transceiver device 200a transmits reference signals and receives reportings of measurements on the transmitted reference signals from the second radio transceiver device 200b. Particularly, according to an embodiment, the angle spread value 190 is obtained from reports of measurements performed by the second radio transceiver device 200b on initial reference signals as transmitted by the radio transceiver device 200a in an initial set of directional beams and as received by the second radio transceiver device 200b.

Figure 4:
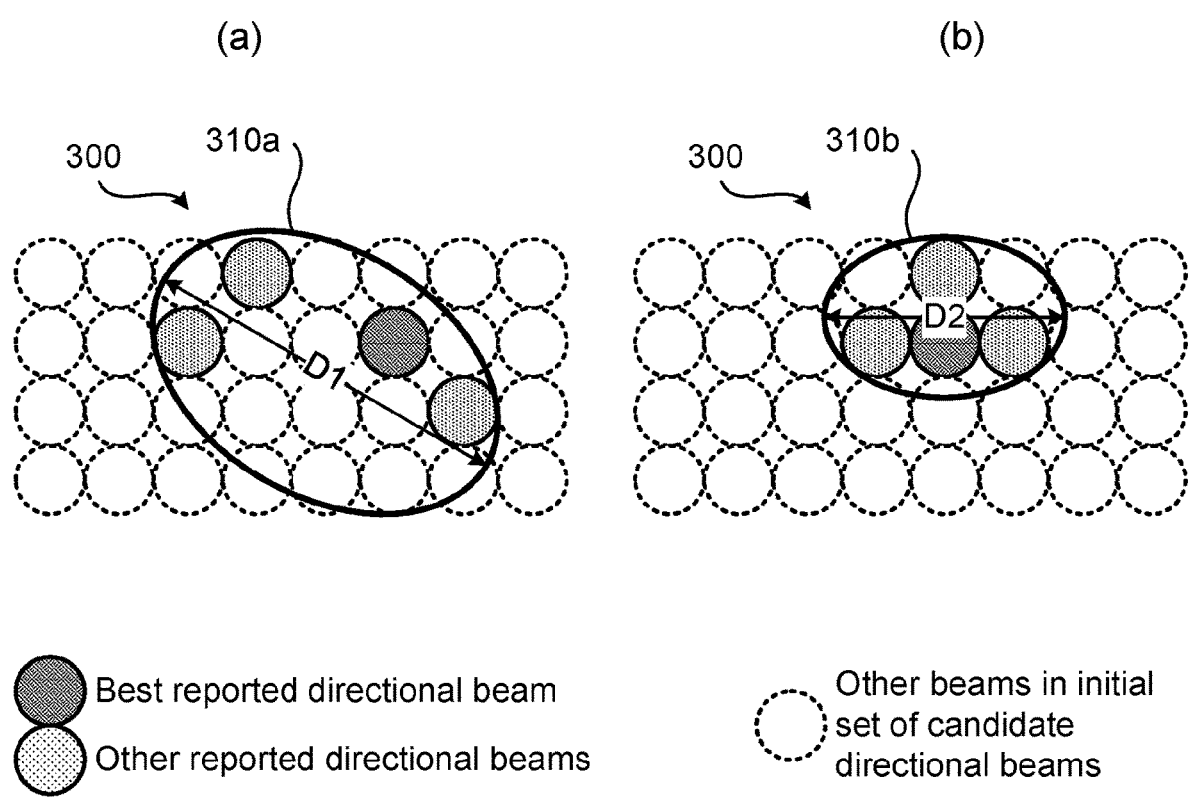
FIG. 4 schematically illustrates the best reported initial directional beams for a GoB according to an embodiment.

Intermediate reference is here made to FIG. 4. FIG. 4 schematically illustrates two examples where initial reference signals are transmitted by the radio transceiver device 200a in an initial set of directional beams 300. The different sized ellipses in FIG. 4(*a*) compared to FIG. 4(*b*) illustrate different angle spread of the L=4 best reported initial directional beams, where the angle spread values depend on the largest diameter D1, D2, of each of the ellipses 310a, 310b. The angle spread value for the example in FIG. 4(*a*) is thus larger than the angle spread value for the examples in FIG. 4(*b*).

In some aspects, the initial set of reference signals are transmitted in comparatively large set of directional beams. That is, in some embodiments, the initial set of directional beams is larger than the candidate set of directional beams.

There could be different ways to generate the initial set of directional beams. In some aspects, the initial set of directional beams is defined by a GoB and can be utilized for a cell-wide beam sweep. That is, in some embodiments, the initial set of directional beams is defined by a cell-covering grid of beams.

In some aspects, the reported directional beams are weighted based on the reported quality measure, such as RSRP per beam. That is, in some embodiments, each report identifies in which at least two directional beams in the initial set of directional beams the initial reference signals were received at highest RSRP at the second radio transceiver device 200b. The angle spread value 190 depends on which at least two directional beams in the initial set of directional beams were identified. Each of these at least two directional beams is then weighted according to its RSRP.

In some aspects, the transmission of the initial reference signals occurs more seldom than the beam management procedure in step S104. That is, in some embodiments, the initial reference signals are transmitted less frequent in time than the reference signals transmitted in the candidate set of directional beams.

There could be different types of initial reference signals. In some examples, the initial reference signals are CSI-RS-BM.

In some aspects, it is assumed that the angle spread value 190 is in step S102 obtained by the radio transceiver device 200a performing measurements on reference signals transmitted by the second radio transceiver device 200b. That is, in some embodiments, the angle spread value 190 is obtained from measurements performed by the radio transceiver device 200a on reference signals as transmitted by the second radio transceiver device 200b and as received by the radio transceiver device 200a.

There could be different ways in which the angle spread value 190 determines the sparsity of the directional beams in the candidate set of directional beams.

In some aspects, the angle spread value 190 is compared to angle spread threshold value. A first candidate set of directional beams might be selected in case the angle spread value 190 is higher than the angle spread threshold value and second candidate set of directional beams might be selected in case the angle spread value 190 is not higher than the angle spread threshold value. When the angle spread value 190 thus has been obtained as in step S102, it could be compared to the angle spread threshold value. This comparison then defined a decision rule for determining which directional beams to include in the candidate set of directional beams. In some embodiments, the candidate set of directional beams thus consists of a first set of directional beams when the angle spread value 190 is higher than the angle spread threshold value, and the candidate set of directional beams otherwise consists of a second set of directional beams. The first set of directional beams has higher sparsity than the second set of directional beams. As the skilled person understands, there might be two or more such angle spread threshold values in order to enable selection between more than two candidate sets of directional beams.

Figure 5:
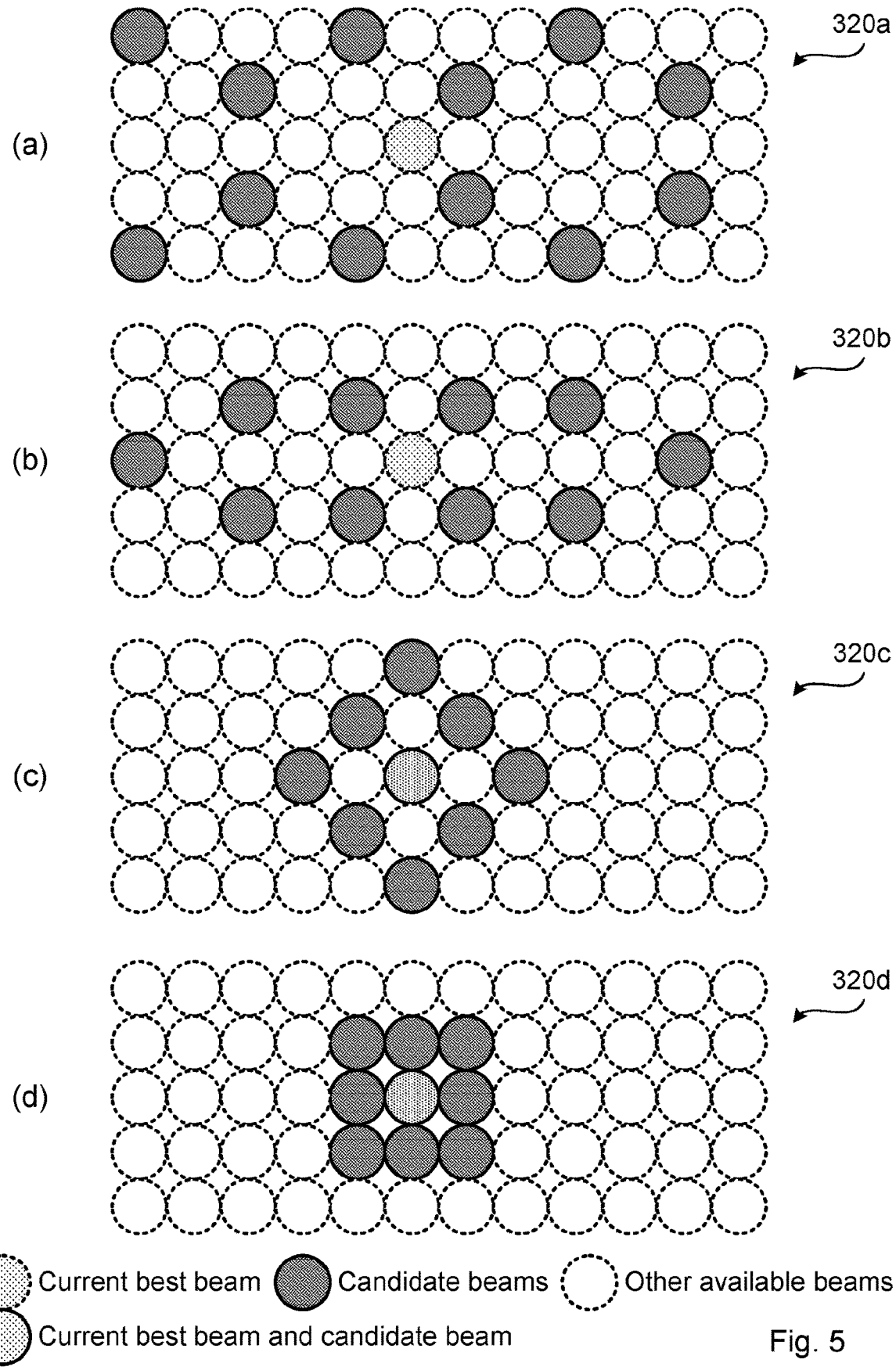
FIG. 5 schematically illustrates examples of candidate set of directional beams according to an embodiment.

Intermediate reference is here made to FIG. 5. FIG. 5 at (a)-(d) schematically illustrates four different examples of candidate set of directional beams 320a, 320b, 320c, 320d with decreasing sparsity. That is, candidate set of directional beams 320a has higher sparsity than candidate set of directional beams 320b and so on. Further, candidate set of directional beams 320a has higher vertical coverage than candidate set of directional beams 320b since candidate set of directional beams 320b only consists of beams in the three center-most vertical beam directions. Still further, candidate set of directional beams 320a and candidate set of directional beams 320b have higher horizontal coverage than candidate set of directional beams 320c and 320d since candidate set of directional beams 320c only consists of beams in the five, and three, center-most horizontal beam directions, respectively. Selecting between these four candidate sets of directional beams 320a:320d requires the use of three threshold values (assuming that each candidate set of directional beams is available for selection each time a new candidate set of directional beams is to be selected). Each candidate set of directional beams 320a:320d corresponds to its own angle spread value, or range of angel spread values, and for illustrative purposes it is assumed that the previously used best directional beam is located as center-most as possible among all available directional beams. The previously used best directional beam might either be included in the candidate set of directional beams or not; in the illustrative example of FIG. 5, the previously used best directional beam is included in the candidate sets of directional beams 320c, 320d.

There could be different definitions of the sparsity. In some aspects, the sparsity is defined in the spatial domain whereas in other aspects the sparsity is defined in the time domain. In particular, in some embodiments, the sparsity defines the angular distance between neighbouring beams in the candidate set of directional beams. In some embodiments, the sparsity defines at which time interval the reference signals are to be transmitted or received in the candidate set of directional beams. In some embodiments, the sparsity defines a combination of the angular distance between neighbouring beams in the candidate set of directional beams and at which time interval the reference signals are to be transmitted or received in the candidate set of directional beams.

In some aspects, the beam management procedure is repeated using the same candidate set of directional beams until a new value of the angle spread value is obtained. That is, in some embodiments, the beam management procedure is repeated using the candidate set of directional beams as dependent on the angle spread value 190 at least until a new angle spread value 190 is obtained. In this respect, the beam management procedure is necessarily not repeated with the exact same directional beams, but all candidate sets of directional beams are dependent on the same obtained angle spread value 190 such that all candidate sets of directional beams have the same sparsity. The angle spread value 190 thus still determines the sparsity of the directional beams in all the candidate set of directional beams.

In further aspects, the angle spread value 190 might affect how often the beam management procedure itself is performed. That is, in some embodiments, how often in time to repeat the beam management procedure using the candidate set of directional beams as dependent on the angle spread value 190 depends on the angle spread value 190.

In further aspects, the angle spread value 190 might affect the time to obtain a new angle spread value. That is, in some embodiments, the angle spread value 190 defines a recent-most angle spread value 190, and time duration until a new angle spread value 190 is obtained depends at least on the recent-most obtained angle spread value 190. Hence, in this respect, the time duration might be based on two or more previously obtained angle spread values 190 and this a history of previously obtained angle spread values 190 might be used to determine the time duration until a new angle spread value 190 is to be obtained. This, for example, enables the time duration until a new angle spread value is obtained to be decreased in a radio environment with highly fluctuating radio channel conditions, or vice versa, and thus to be dependent on the radio environment.

There could be different ways to determine which directional beams to be included in the candidate set of directional beams.

In some aspects, the candidate set of directional beams is based on adapting a default set of directional beams according to the angle spread value 190. In particular, in some embodiments, the sparsity of the directional beams in the candidate set of directional beams is determined by scaling the angular distance between neighbouring beams in a default set of directional beams according to a scaling value, where the scaling value is dependent on the angle spread value 190. For example, the directional beams in the candidate set of directional beams could be selected from a GoB with an angular distance between neighbouring beams determined according to a beam index distance (ΔBI) defined as:

$$\Delta BI = \pm k \cdot \sigma_{AS} / \Delta GoB.$$

Here, ΔGoB is the beam separation angle between neighbouring beams in the GoB, $\sigma_{AS}$ denotes the angle spread value 190, and k is a control parameter. The beam separation in the GoB can vary and the angle spread value 190 can also be mapped to the closest beam in the GoB taking different angle separation into account.

Separate values of the angle spread could be obtained for the vertical domain and the horizontal domain, respectively. Therefore, in some embodiment, the sparsity of the directional beams in the candidate set of directional beams is determined separately in vertical domain and in horizontal domain. The beam management procedure might thereby be individually controlled in each of the vertical domain and the horizontal domain. In this respect, in some scenarios where the vertical movement of the second radio transceiver devices 200b is smaller than their horizontal movement, the vertical angle spread value might be smaller than the horizontal angle spread value. Also, in areas with high-rise buildings, the vertical mobility of individual second radio transceiver devices 200b might be smaller than the horizontal mobility and the possible reflections in elevation is less likely than in azimuth. This might result in a candidate set of directional beams where the vertical angle spread value is smaller than the horizontal angle spread value.

Figure 6:
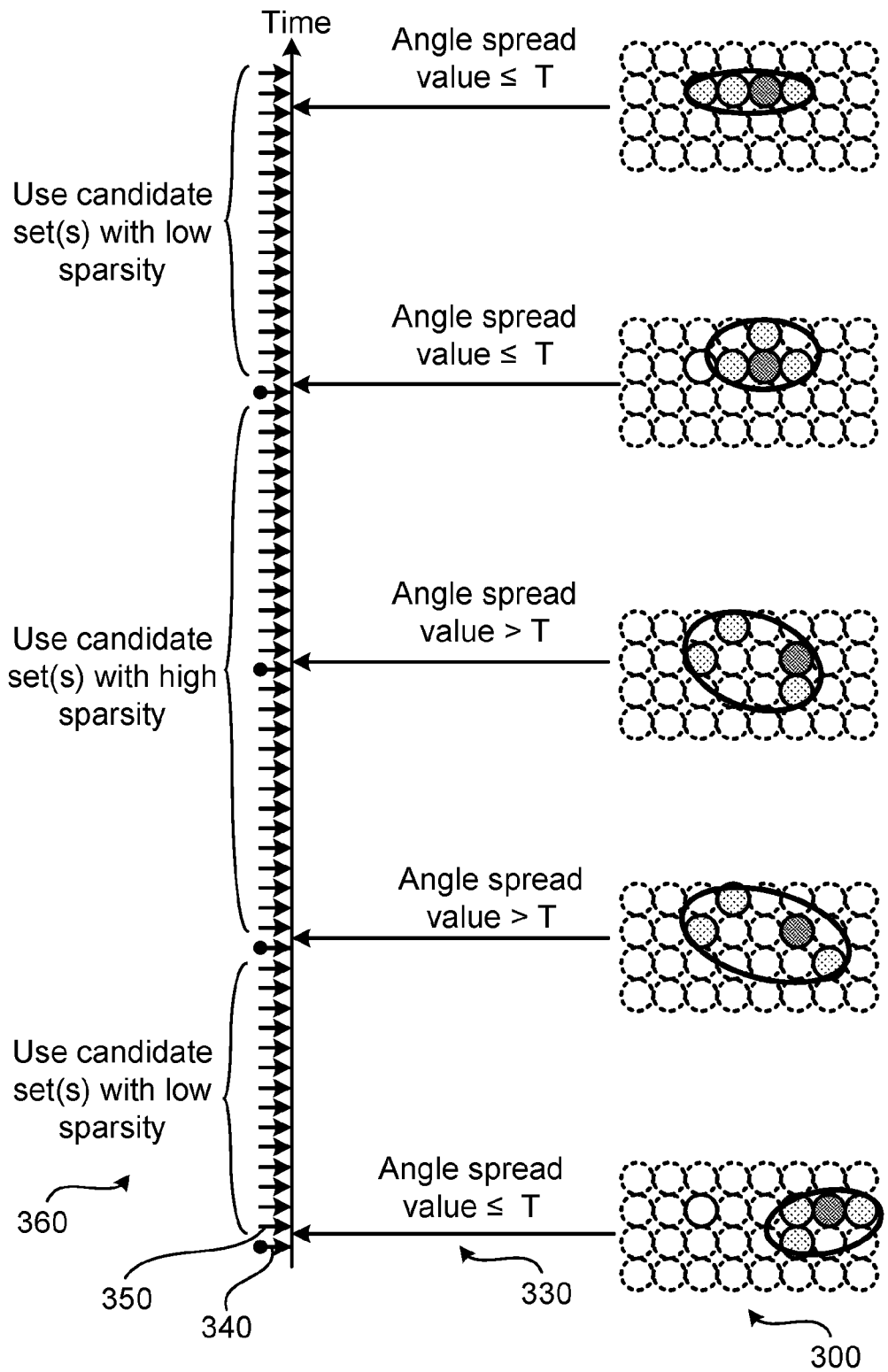
FIG. 6 schematically illustrates beam management procedures performed along a timeline according to an embodiment.

Intermediate reference is now made to FIG. 6. FIG. 6 schematically illustrates beam management procedures performed along a timeline. At 340 is illustrated, by means of a series of arrows, the transmission occasions of the above disclosed initial reference signals. At 300 is illustrated the initial set of directional beams in which the initial reference signals are transmitted. Also is illustrated the angle spread of the L=4 best reported initial directional beams and their corresponding ellipses. At 330 is illustrated the reporting of the initial directional beams and how angle spread of the best reported initial directional beams relates to a threshold value T. At 350 is illustrated, by means of a series of arrows, the occasions where the beam management procedure is performed. At 360 is illustrated whether the beam management procedures that are performed until a new set of initial reference signals is transmitted are to use candidate set of directional beams with low sparsity (such as any of candidate set of directional beams 320c or 320d) or candidate set of directional beams with high sparsity (such as any of candidate set of directional beams 320a or 320b).

In some aspects, when the beam management procedure involves transmitting the reference signals, the second radio transceiver device 200b performs measurements on the transmitted reference signals and reports back the measurements to the radio transceiver device 200a. That is, according to this embodiment, the radio transceiver device 200a is configured to perform (optional) step S106:

S106: The radio transceiver device 200a receives reports of measurements performed by the second radio transceiver device 200b on the reference signals having been transmitted by the radio transceiver device 200a in the candidate set of directional beams.

The selected directional beam is then utilized for further communication, for example in terms of data signalling or control signalling, with the second radio transceiver device 200b. That is, according to this embodiment, the radio transceiver device 200a is configured to perform (optional) step S108:

S108: The radio transceiver device 200a communicates with the second radio transceiver device 200b using the selected directional beam in the candidate set of directional beams as indicated in the reports.

The radio transceiver device 200b in the user equipment 160 may have beamforming and a large set of beam candidates. To search for the best beam among these beams is also a trade-off between loss compared to best beam, time to find best beam and cost in sending reference signals and measuring. The methods described above can thus similarly be applied to select beam scanning both in time and in angular sparsity. This applies both for communication with a transmission and reception point 140 (i.e., when radio transceiver device 200a is part of the transmission and reception point 140) or another UE 160 (i.e., when radio transceiver device 200a is part of another user equipment 160).

For example, an angle spread value can be obtained by the radio transceiver device 200b in the user equipment 160 by measuring signal strength on received beams, such as measuring on DMRS in SSB or data transmissions. The scanning for best received beam among candidate beams is then adapted to angle spread according to any of the above described methods, with sparser search for large angle spread than for narrow angle spread.

Figure 7:
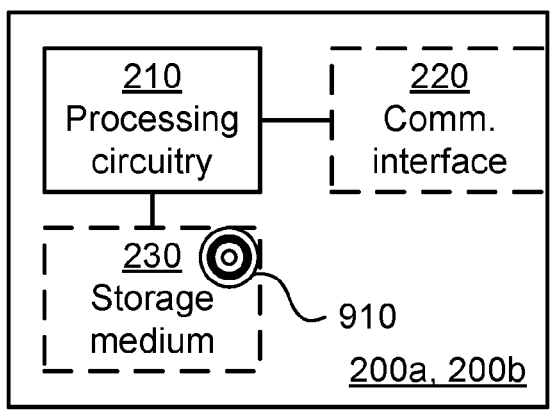
FIG. 7 is a schematic diagram showing functional units of a radio transceiver device according to an embodiment.

FIG. 7 schematically illustrates, in terms of a number of functional units, the components of a radio transceiver device 200a, 200b according to an embodiment. Processing circuitry 210 is provided using any combination of one or more of a suitable central processing unit (CPU), multiprocessor, microcontroller, digital signal processor (DSP), etc., capable of executing software instructions stored in a computer program product 910 (as in FIG. 9), e.g. in the form of a storage medium 230. The processing circuitry 210 may further be provided as at least one application specific integrated circuit (ASIC), or field programmable gate array (FPGA).

Particularly, the processing circuitry 210 is configured to cause the radio transceiver device 200a, 200b to perform a set of operations, or steps, as disclosed above. For example, the storage medium 230 may store the set of operations, and the processing circuitry 210 may be configured to retrieve the set of operations from the storage medium 230 to cause the radio transceiver device 200a, 200b to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The radio transceiver device 200a, 200b may further comprise a communications interface 220 at least configured for communications with other entities, functions, nodes, and devices of the communication network 100, such as another radio transceiver device 200a, 200b, 200b. As such the communications interface 220 may comprise one or more transmitters and receivers, comprising analogue and digital components. The processing circuitry 210 controls the general operation of the radio transceiver device 200a, 200b e.g. by sending data and control signals to the communications interface 220 and the storage medium 230, by receiving data and reports from the communications interface 220, and by retrieving data and instructions from the storage medium 230. Other components, as well as the related functionality, of the radio transceiver device 200a, 200b are omitted in order not to obscure the concepts presented herein.

Figure 8:
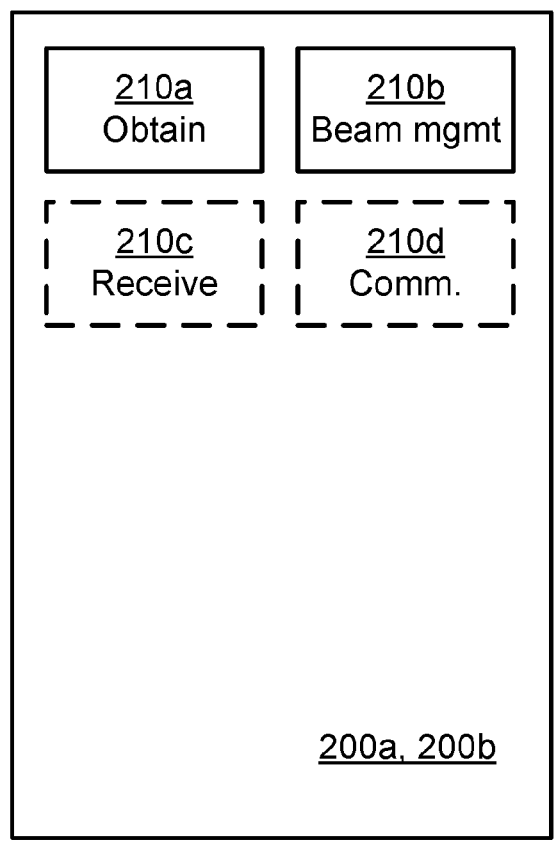
FIG. 8 is a schematic diagram showing functional modules of a radio transceiver device according to an embodiment.

FIG. 8 schematically illustrates, in terms of a number of functional modules, the components of a radio transceiver device 200a, 200b according to an embodiment. The radio transceiver device 200a, 200b of FIG. 8 comprises a number of functional modules; an obtain module 210a configured to perform step S102, and a beam management module 210b configured to perform step S104. The radio transceiver device 200a, 200b of FIG. 8 may further comprise a number of optional functional modules, such as any of a receive module 210c configured to perform step S106, and a communicate module 210d configured to perform step S108. In general terms, each functional module 210a-210d may in one embodiment be implemented only in hardware and in another embodiment with the help of software, i.e., the latter embodiment having computer program instructions stored on the storage medium 230 which when run on the processing circuitry makes the radio transceiver device 200a, 200b perform the corresponding steps mentioned above in conjunction with FIG. 8. It should also be mentioned that even though the modules correspond to parts of a computer program, they do not need to be separate modules therein, but the way in which they are implemented in software is dependent on the programming language used. Preferably, one or more or all functional modules 210a-210d may be implemented by the processing circuitry 210, possibly in cooperation with the communications interface 220 and/or the storage medium 230. The processing circuitry 210 may thus be configured to from the storage medium 230 fetch instructions as provided by a functional module 210a-210d and to execute these instructions, thereby performing any steps as disclosed herein.

The radio transceiver device 200a, 200b may be provided as a standalone device or as a part of at least one further device. For example, the radio transceiver device 200a, 200b may be provided in a node of the radio access network 110, such as in a radio access network node 150, or in a node of the core network 120, or in a UE 160. Alternatively, functionality of the radio transceiver device 200a, 200b may be distributed between at least two devices, or nodes. These at least two nodes, or devices, may either be part of the same network part (such as the radio access network or the core network) or may be spread between at least two such network parts. In general terms, instructions that are required to be performed in real time may be performed in a device, or node, operatively closer to the cell than instructions that are not required to be performed in real time.

Thus, a first portion of the instructions performed by the radio transceiver device 200a, 200b may be executed in a first device, and a second portion of the of the instructions performed by the radio transceiver device 200a, 200b may be executed in a second device; the herein disclosed embodiments are not limited to any particular number of devices on which the instructions performed by the radio transceiver device 200a, 200b may be executed. Hence, the methods according to the herein disclosed embodiments are suitable to be performed by a radio transceiver device 200a, 200b residing in a cloud computational environment. Therefore, although a single processing circuitry 210 is illustrated in FIG. 7 the processing circuitry 210 may be distributed among a plurality of devices, or nodes. The same applies to the functional modules 210a-210d of FIG. 8 and the computer program 920 of FIG. 9.

Figure 9:
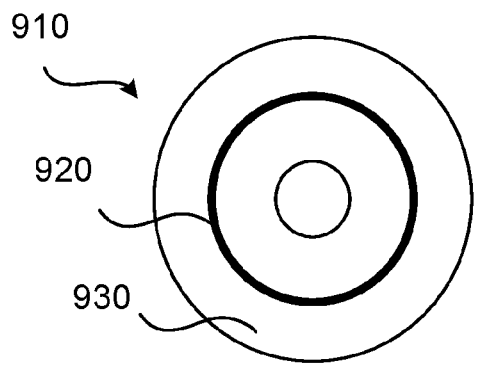
FIG. 9 shows one example of a computer program product comprising computer readable storage medium according to an embodiment.

FIG. 9 shows one example of a computer program product 910 comprising computer readable storage medium 930. On this computer readable storage medium 930, a computer program 920 can be stored, which computer program 920 can cause the processing circuitry 210 and thereto operatively coupled entities and devices, such as the communications interface 220 and the storage medium 230, to execute methods according to embodiments described herein. The computer program 920 and/or computer program product 910 may thus provide means for performing any steps as herein disclosed.

In the example of FIG. 9, the computer program product 910 is illustrated as an optical disc, such as a CD (compact disc) or a DVD (digital versatile disc) or a Blu-Ray disc. The computer program product 910 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 920 is here schematically shown as a track on the depicted optical disk, the computer program 920 can be stored in any way which is suitable for the computer program product 910.

Figure 10:
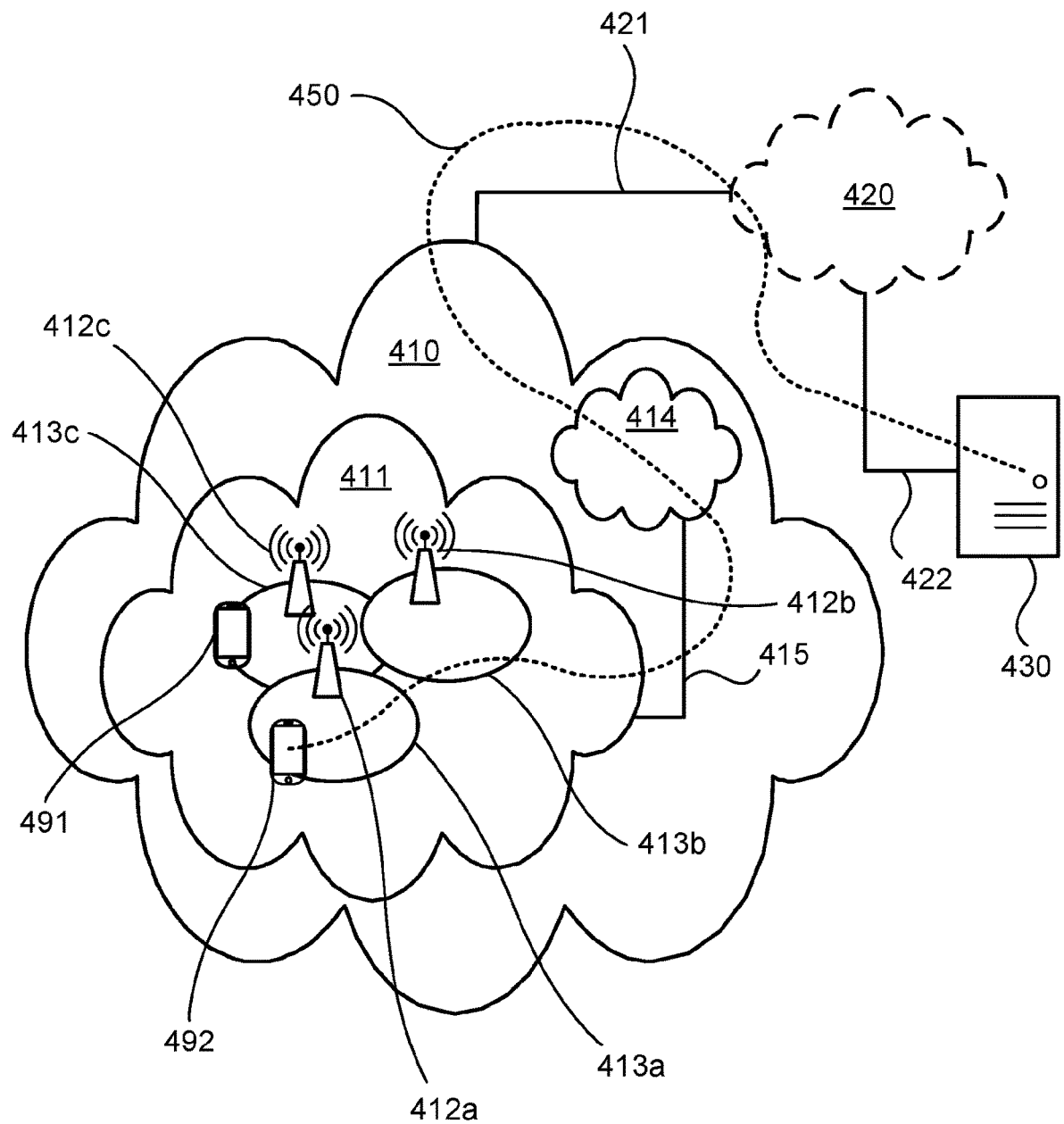
FIG. 10 is a schematic diagram illustrating a telecommunication network connected via an intermediate network to a host computer in accordance with some embodiments.

FIG. 10 is a schematic diagram illustrating a telecommunication network connected via an intermediate network 420 to a host computer 430 in accordance with some embodiments. In accordance with an embodiment, a communication system includes telecommunication network 410, such as a 3GPP-type cellular network, which comprises access network 411, such as radio access network 110 in FIG. 1, and core network 414, such as core network 120 in FIG. 1. Access network 411 comprises a plurality of radio access network nodes 412a, 412b, 412c, such as NBs, eNBs, gNBs (each corresponding to the radio access network node 150 of FIG. 1) or other types of wireless access points, each defining a corresponding coverage area, or cell, 413a, 413b, 413c. Each radio access network nodes 412a, 412b, 412c is connectable to core network 414 over a wired or wireless connection 415. A first UE 491 located in coverage area 413c is configured to wirelessly connect to, or be paged by, the corresponding network node 412c. A second UE 492 in coverage area 413a is wirelessly connectable to the corresponding network node 412a. While a plurality of UE 491, 492 are illustrated in this example, the disclosed embodiments are equally applicable to a situation where a sole UE is in the coverage area or where a sole terminal device is connecting to the corresponding network node 412. The UEs 491, 492 correspond to the UE 160 of FIG. 1.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 10 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, network node 412 may not or need not be informed about the past routing of an incoming downlink communication with data originating from host computer 430 to be forwarded (e.g., handed over) to a connected UE 491. Similarly, network node 412 need not be aware of the future routing of an outgoing uplink communication originating from the UE 491 towards the host computer 430.

Figure 11:
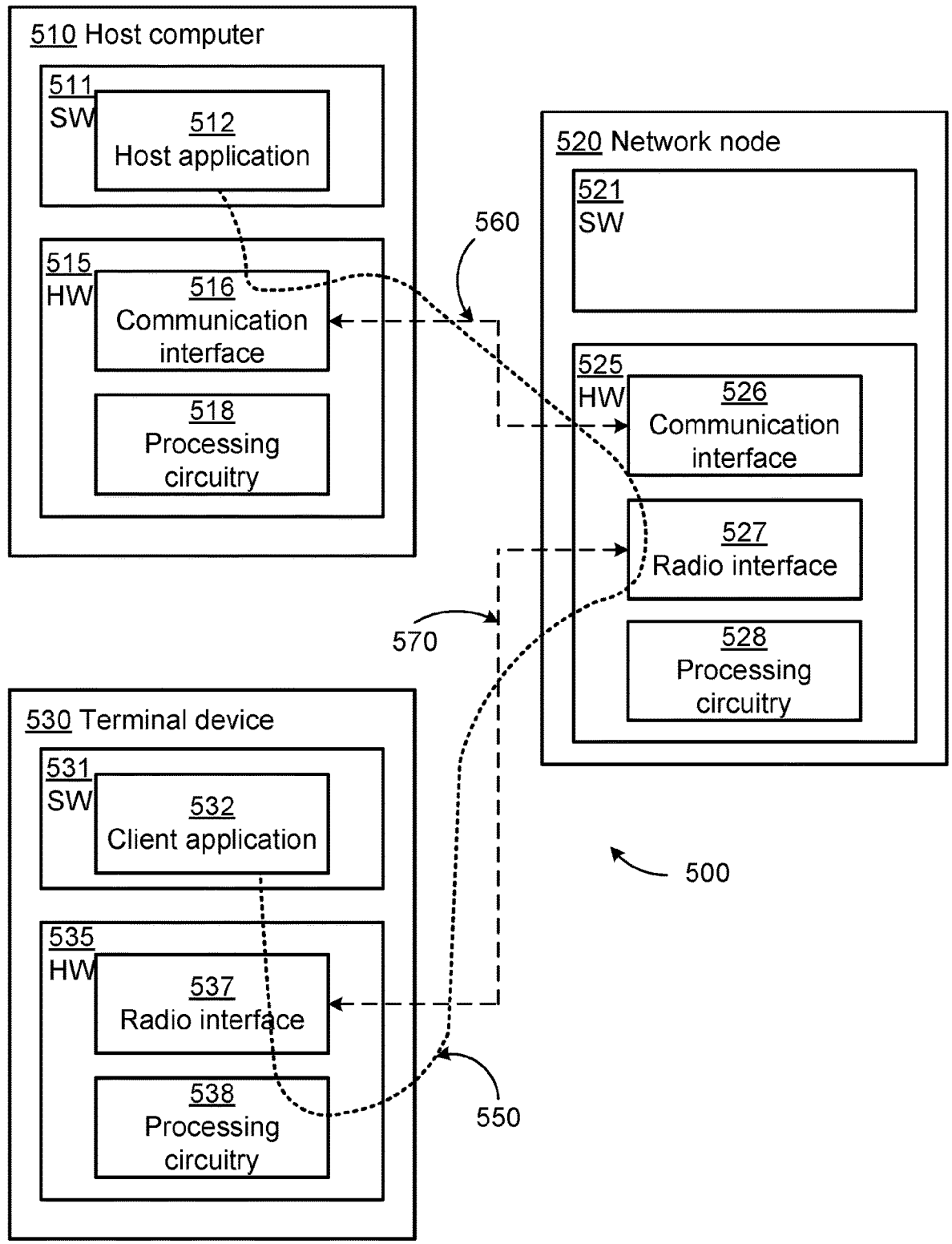
FIG. 11 is a schematic diagram illustrating host computer communicating via a radio base station with a terminal device over a partially wireless connection in accordance with some embodiments.

FIG. 11 is a schematic diagram illustrating host computer communicating via a radio access network node with a UE over a partially wireless connection in accordance with some embodiments. Example implementations, in accordance with an embodiment, of the UE, radio access network node and host computer discussed in the preceding paragraphs will now be described with reference to FIG. 11. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown)

adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. The UE 530 corresponds to the UE 160 of FIG. 1. In providing the service to the remote user, host application 512 may provide user data which is transmitted using OTT connection 550.

Communication system 500 further includes radio access network node 520 provided in a telecommunication system and comprising hardware 525 enabling it to communicate with host computer 510 and with UE 530. The radio access network node 520 corresponds to the radio access network node 150 of FIG. 1. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 11) served by radio access network node 520. Communication interface 526 may be configured to facilitate connection 560 to host computer 510. Connection 560 may be direct or it may pass through a core network (not shown in FIG. 11) of the telecommunication system and/or through one or more intermediate networks outside the telecommunication system. In the embodiment shown, hardware 525 of radio access network node 520 further includes processing circuitry 528, which may comprise one or more programmable processors, application-specific integrated circuits, field programmable gate arrays or combinations of these (not shown) adapted to execute instructions. Radio access network node 520 further has software 521 stored internally or accessible via an external connection.

Communication system 500 further includes UE 530 already referred to. Its hardware 535 may include radio interface 537 configured to set up and maintain wireless connection 570 with a radio access network node serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, radio access network node 520 and UE 530 illustrated in FIG. 11 may be similar or identical to host computer 430, one of network nodes 412a, 412b, 412c and one of UEs 491, 492 of FIG. 10, respectively. This is to say, the inner workings of these entities may be as shown in FIG. 11 and independently, the surrounding network topology may be that of FIG. 10.

In FIG. 11, OTT connection 550 has been drawn abstractly to illustrate the communication between host computer 510 and UE 530 via network node 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and radio access network node 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may reduce interference, due to improved classification ability of airborne UEs which can generate significant interference.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect network node 520, and it may be unknown or imperceptible to radio access network node 520. Such procedures and functionalities may be known and practiced in the art. In certain embodiments, measurements may involve proprietary UE signaling facilitating host computer's 510 measurements of throughput, propagation times, latency and the like. The measurements may be implemented in that software 511 and 531 causes messages to be transmitted, in particular empty or 'dummy' messages, using OTT connection 550 while it monitors propagation times, errors etc.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for beam management, the method being performed by a radio transceiver device, and the method comprising:
obtaining an angle spread value representing an angular spread of signal paths towards a second radio transceiver device;
selecting directional beams from an available set of directional beams to form a candidate set of directional beams, wherein a sparsity of directional beams in the candidate set relative to directional beams in the available set depends on the angle spread value; and performing a beam management procedure that comprises choosing one of the directional beams from the candidate set to use for communication with the second radio transceiver device, wherein the choosing is based on measurement results of transmitting or receiving reference signals via the candidate set of directional beams.

2. The method according to claim 1, wherein selecting the candidate set of directional beams comprises selecting a first set from the available set when the angle spread value is higher than an angle spread threshold value, and otherwise selecting a second set from the available set, and wherein the sparsity of the first set is higher than the sparsity of the second set.

3. The method according to claim 1, wherein the angle spread value represents angular spread of the signal paths in horizontal and angular domains, and wherein the available set of directional beams spans a range of horizontal beam angles and a range of vertical beam angles.

4. The method according to claim 1, further comprising repeating the beam management procedure using the candidate set of directional beams at least until a new angle spread value is obtained and a correspondingly new candidate set of directional beams is selected.

5. The method according to claim 4, further comprising determining how often in time to repeat the beam management procedure in dependence on the angle spread value.

6. The method according to claim 1, further comprising determining how long to wait before obtaining a new angle spread value for corresponding selection of new candidate set of directional beams, in dependence on the angle spread value.

7. The method according to claim 1, wherein obtaining the angle spread value comprises obtaining the angle spread value from reports of measurements performed by the second radio transceiver device on initial reference signals as transmitted by the radio transceiver device in an initial set of directional beams and as received by the second radio transceiver device, and wherein the initial set of directional beams contains all or a subset of the available set of beam directions.

8. The method according to claim 7, wherein the initial set of directional beams is larger than the candidate set of directional beams.

9. The method according to claim 7, wherein each report identifies in which at least two directional beams in the initial set of directional beams the initial reference signals were received at highest reference signal received power (RSRP), at the second radio transceiver device, wherein the angle spread value depends on which at least two directional beams in the initial set of directional beams were identified, and wherein each of said at least two directional beams is weighted according to its RSRP.

10. The method according to claim 7, wherein the initial reference signals are channel state information reference signals for beam management (CSI-RS-BM).

11. The method according to claim 7, wherein the initial reference signals are transmitted less frequently in time than the reference signals transmitted via the candidate set of directional beams.

12. The method according to claim 1, wherein the sparsity is higher for higher angle spread values or ranges of angle spread value.

13. The method according to claim 1, wherein obtaining the angle spread value comprises determining the angle spread value from measurements performed by the radio transceiver device on reference signals as transmitted by the second radio transceiver device and as received by the radio transceiver device.

14. The method according to claim 1, wherein the available set of directional beams is a grid of beams distributed over an angular range, and wherein the sparsity of directional beams in the candidate set relative to directional beams in the available set depends on the angle spread value, based on the method including scaling angular distance between neighboring directional beams in the grid in dependence on the angle spread value, and selecting which directional beams from the grid to include in the candidate set based on scaled angular distance.

15. The method according to claim 14, wherein the grid spans a range of angles in a horizontal domain and spans a range of angles in a vertical domain, and wherein the sparsity of the directional beams in the candidate set is determined separately for the horizontal and vertical domains.

16. The method according to claim 1,
wherein the signal paths are signal paths that, according to reference-signal measurements, can support reliable communication with the second radio transceiver device,
wherein the available set of directional beams is a grid of directional beams that provides a certain beam density over an angular range spanned by the grid, according to angular distance between neighboring directional beams in the grid,
wherein the candidate set is a proper subset of the grid and comprises a plurality of directional beams from the grid that are centered around and may include the directional beam in the grid that is or most recently was identified as a best directional beam for communicating with the second radio transceiver device, and
wherein the directional beams from the grid that are included in the candidate set are determined by scaling the angular distance between neighboring directional beams in the grid to obtain scaled angular distance, and selecting directional beams from the grid at grid positions corresponding with the scaled angular distance, such that the sparsity is higher for higher angle spread values or higher ranges of angle spread value.

17. The method according to claim 1, wherein the radio transceiver device is part of a radio access network node, and wherein the second radio transceiver device is part of a user equipment.

18. The method according to claim 1, wherein the radio transceiver device is part of a user equipment, and wherein the second radio transceiver device is part of a radio access network node or is part of a second user equipment.

19. A radio transceiver device for beam management, the radio transceiver device comprising:
a communication interface comprising one or more transmitters and one or more receivers, for transmitting signals for and receiving signals from a second radio transceiver device; and
processing circuitry configured to:
obtain an angle spread value representing an angular spread of signal paths towards the second radio transceiver device;
select directional beams from an available set of directional beams to form a candidate set of directional beams, wherein a sparsity of directional beams in the candidate set relative to directional beams in the available set depends on the angle spread value; and perform a beam management procedure that comprises choosing one of the directional beams from the candidate set to use for communication with the second radio transceiver device, wherein the choosing is based on measurement results of transmitting or receiving reference signals via the candidate set of directional beams.

20. A non-transitory computer readable storage media storing a computer program for beam management, the computer program comprising computer program instructions which, when run on processing circuitry of a radio transceiver device, cause the radio transceiver device to:

obtain an angle spread value representing an angular spread of signal paths towards a second radio transceiver device;

select directional beams from an available set of directional beams to form a candidate set of directional beams, wherein a sparsity of directional beams in the candidate set relative to directional beams in the available set depends on the angle spread value; and perform a beam management procedure that comprises choosing one of the directional beams from the candidate set to use for communication with the second radio transceiver device, wherein the choosing is based on measurement results of transmitting or receiving reference signals via the candidate set of directional beams.

\* \* \* \* \*